(No Model.) 2 Sheets—Sheet 1.
S. EVERSHED.
APPARATUS FOR THE MEASUREMENT OF ELECTRICAL RESISTANCES.
No. 478,098. Patented July 5, 1892.
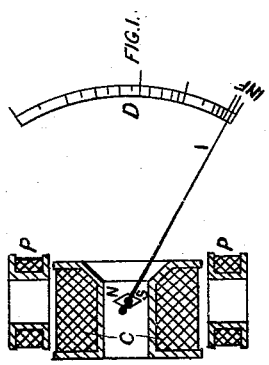
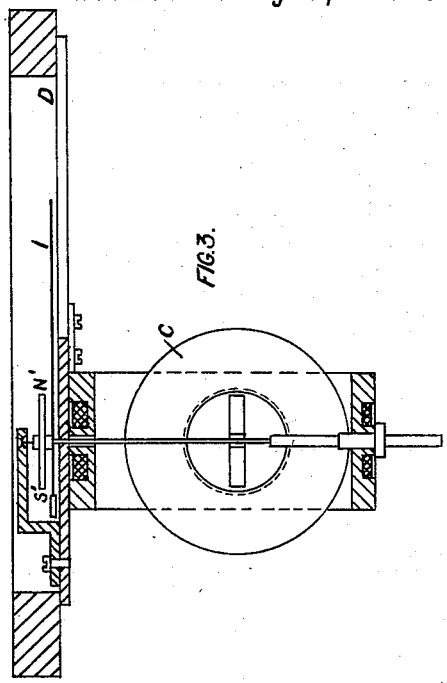
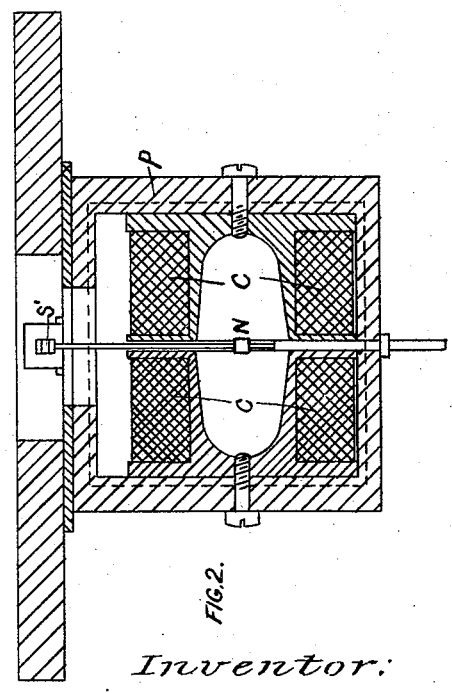
Witnesses:
E. B. Bolton
W. A. Walsh
Inventor:
Sydney Evershed
By Richardson
his Attorneys.

(No Model.) 2 Sheets—Sheet 2.
S. EVERSHED.
APPARATUS FOR THE MEASUREMENT OF ELECTRICAL RESISTANCES.
No. 478,098. Patented July 5, 1892.
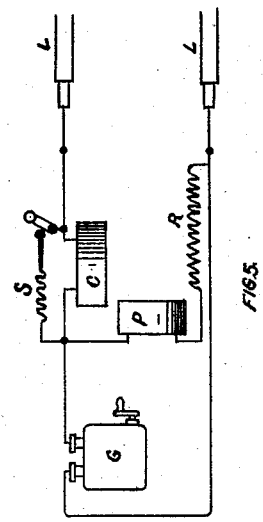
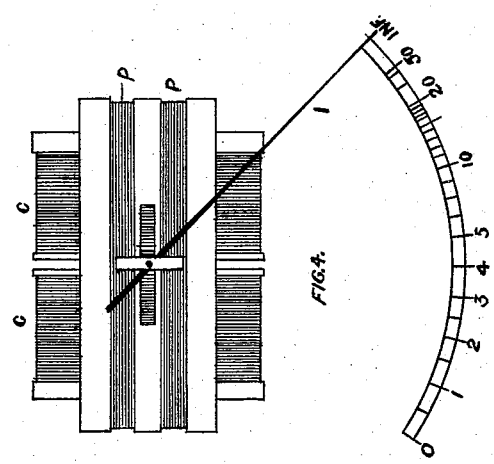
Witnesses
E. B. Bolton
M. W. Walsh
Inventor:
Sydney Evershed
By Richards
his Attorneys

UNITED STATES PATENT OFFICE.

SYDNEY EVERSHED, OF LONDON, ENGLAND.

APPARATUS FOR THE MEASUREMENT OF ELECTRICAL RESISTANCES.

SPECIFICATION forming part of Letters Patent No. 478,098, dated July 5, 1892.

Application filed December 22, 1891. Serial No. 415,926. (No model.) Patented in England February 15, 1889, No. 2,694.

*To all whom it may concern:*

Be it known that I, SYDNEY EVERSHED, residing at London, England, have invented an Improvement in Apparatus for the Measurement of Electrical Resistances, (which has been patented in Great Britain and Ireland under No. 2,694, dated February 15, 1889,) of which the following is a specification.

My invention relates to an improved apparatus for the measurement of electrical resistances, known as an "ohmmeter;" and it consists in the special arrangement of two independent coils to one another, to a generator, to mains to be tested, and to a magnetic needle, so that the index-finger of the needle shall start normally from the position in which the resistance of the mains to be tested is infinity and moves upon a calibrated scale indicating an imperfect or reducing resistance by reason of any defective or leakage currents that may exist in the main.

Figure 1 represents a diagrammatic section of the coils of my single-needle ohmmeter and needle. Figs. 2, 3, and 4 are two sections at right angles to one another and a plan, respectively, of my astatic ohmmeter. Fig. 5 is a diagram of the method of connecting up the coils of my ohmmeter with a generator and a main of which the resistance is to be tested.

It is usual in ohmmeters that two coils are arranged at right angles to one another, with a needle in the common axis. One of these coils is wound in shunt to the resistance to be measured and is hereinafter called the "pressure-coil." The other coil is in series with the resistance to be measured and is hereinafter called the "current-coil."

In Fig. 1, C is the current-coil, made as large and wound with as many turns of wire as possible and closely surrounds the needle N S, so that very small leakage-currents through the current-coil may produce a sufficiently strong magnetic field to overcome the friction of the needle system. The pressure-coil is in two portions P P, placed symmetrically on either side of the current-coil, with their common magnetic axis at right angles to the magnetic axis of the current-coil. The index-finger I is attached to the needle at such an angle that when the needle N S lies in the axis of the pressure-coils P P, as shown, the index-finger points to infinity on the scale. This position evidently corresponds with zero-current in the current-coils, and therefore with infinite resistance in the circuit under test.

This instrument, not being astatic, may have a neutralizing-magnet placed either above or below the current-coil to eliminate the effect of the earth's magnetic field.

In Figs. 2, 3, and 4 I show an astatic ohmmeter. The current-coil C C is made in two portions in order to allow of the introduction of the axle and needles N S N' S'. The pressure-coil P P is wound on a square brass frame conveniently divided in two grooves to allow the needle-axle to pass between. The said frame also serves to support the current-coil bobbin. The needle system moves through a right angle—viz., from infinite resistance when the needle lies in the magnetic axis of the pressure-coil to zero resistance when the needle lies in the magnetic axis of the current-coil.

It is usually desirable to measure the insulation resistance of electric mains, dynamos, &c., while under the full working difference of potential. I therefore use with my ohmmeter a generator G, Fig. 5, which may be batteries or a magneto or dynamo electric machine. As shown in the diagram Fig. 5, the generator G and the ohmmeter-coils—viz., P, the pressure-coil, and C, the current-coil—are connected up, so as to test the insulation resistance between the mains L L. The coil C may be shunted, when desired, by the circuit and coil S, so as to enable readings to be continued down to any desired limit in a well-known manner. A resistance R, of German-silver or platinoid wire, is connected in series with the pressure-coil P.

Where it is desired to measure the insulation resistance between the mains and the earth, both mains L L are connected to one terminal of the ohmmeter, the other terminal being connected to earth.

Having now described my invention, what I claim is—

1. In an ohmmeter for the measurement of large resistances, a large current-coil wound with a large number of turns of fine wire, in series with the circuit to be tested and closely surrounding a pivoted magnetic needle and an index-finger, in combination with a pressure coil or coils in shunt with the circuit to be tested and with its magnetic axis at right angles to and intersecting that of the current-coil, substantially as described.

2. An ohmmeter consisting of a current-coil surrounding a magnetic needle fixed on an axis supporting a second astatic needle, the said current-coil supported in a brass frame on which a pressure coil or coils is wound with its magnetic axis at right angles to that of the current-coil, substantially as described.

In testimony whereof I have signed my name to this specification in the presence of two subscribing witnesses.

SYDNEY EVERSHED.

Witnesses:
 REGINALD W. JAMES,
 RICHARD A. HOFFMANN.